Aug. 13, 1940.  E. PEMBERTON  2,211,026
APPARATUS FOR MELTING FUSIBLE MATERIALS
Filed Sept. 23, 1936  3 Sheets-Sheet 1
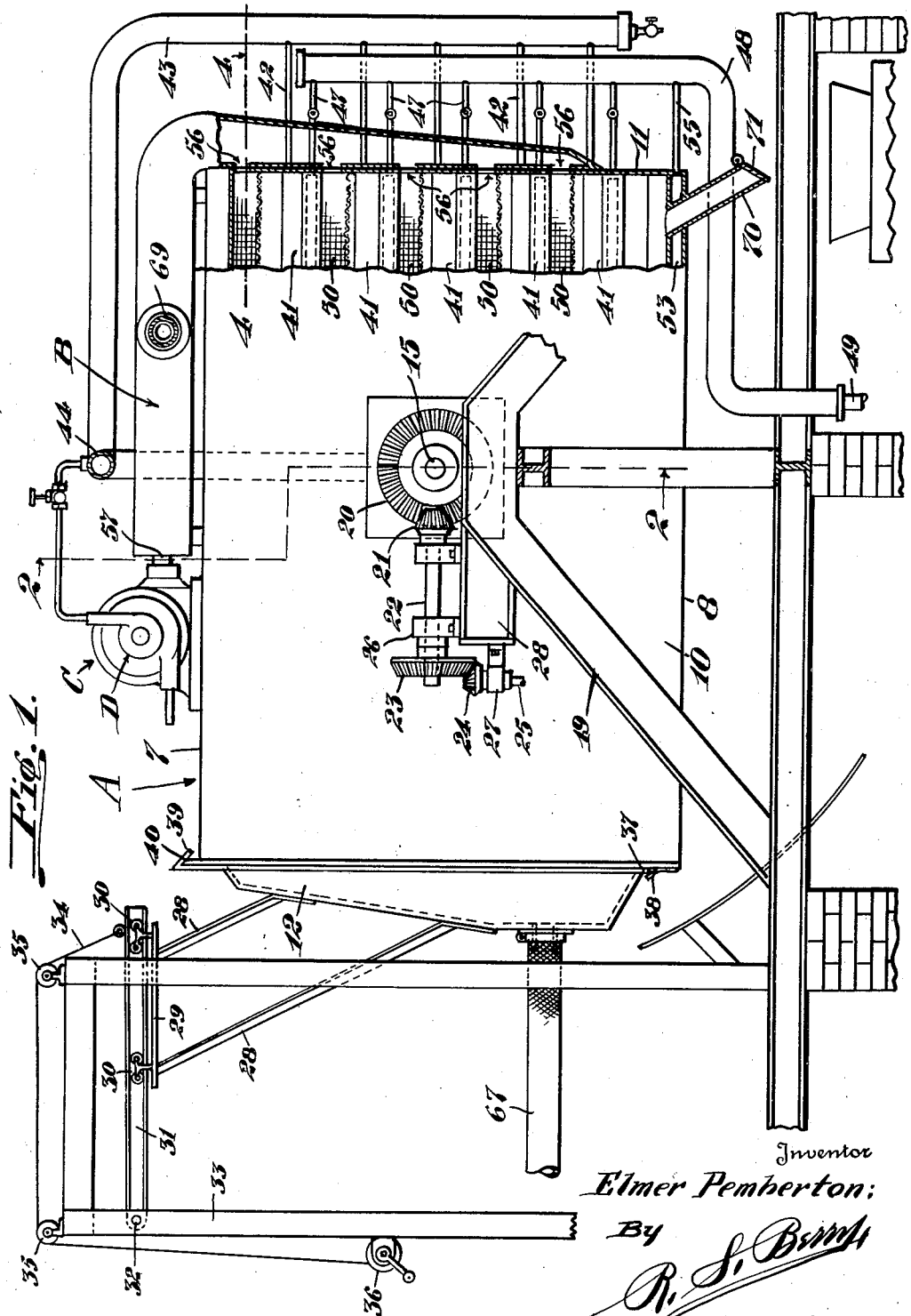
Inventor
*Elmer Pemberton;*
By
*R. S. Bush*
Attorney Aug. 13, 1940.  E. PEMBERTON  2,211,026
APPARATUS FOR MELTING FUSIBLE MATERIALS
Filed Sept. 23, 1936  3 Sheets-Sheet 2
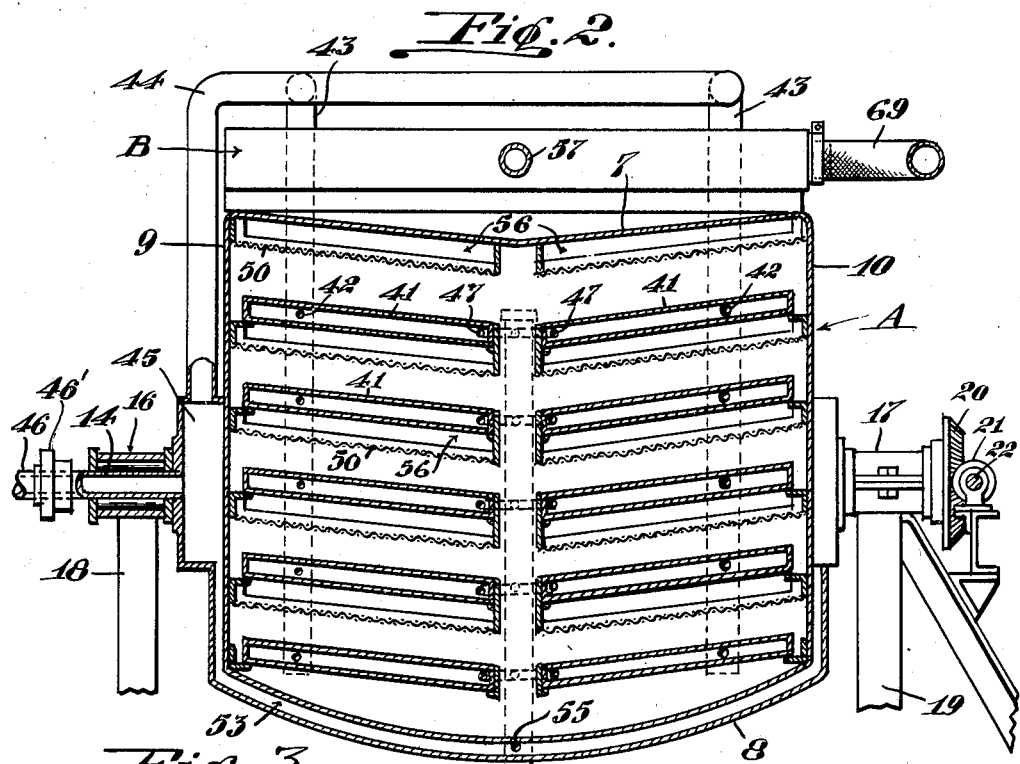
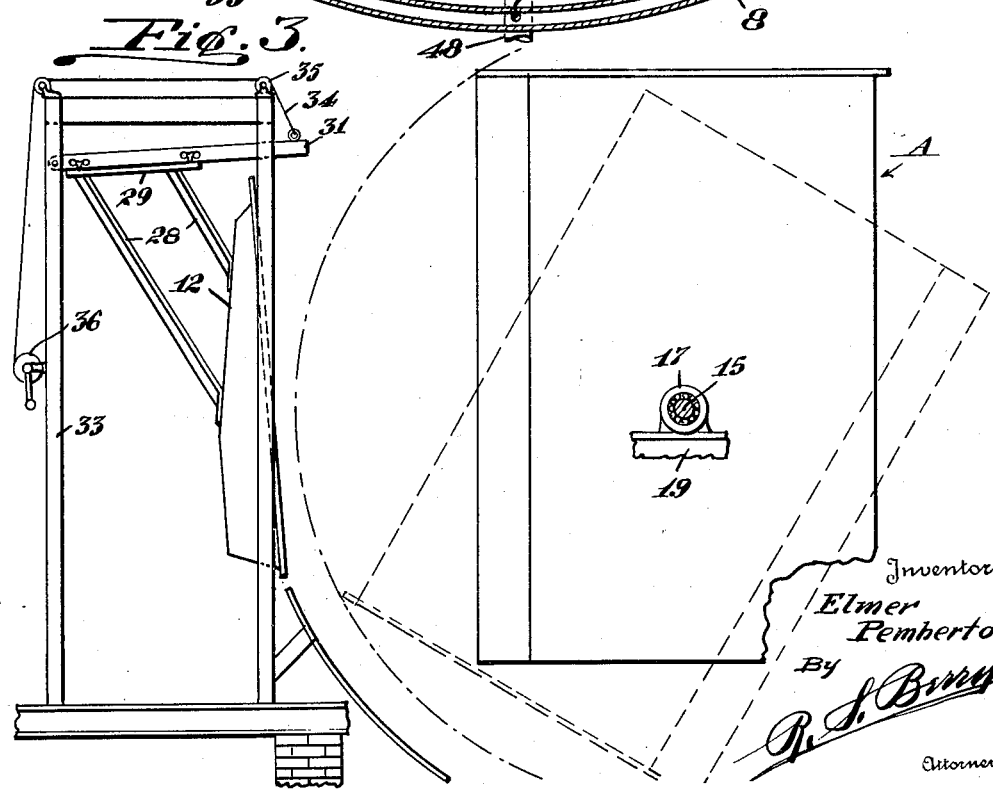
Inventor
Elmer Pemberton;
By
Attorney

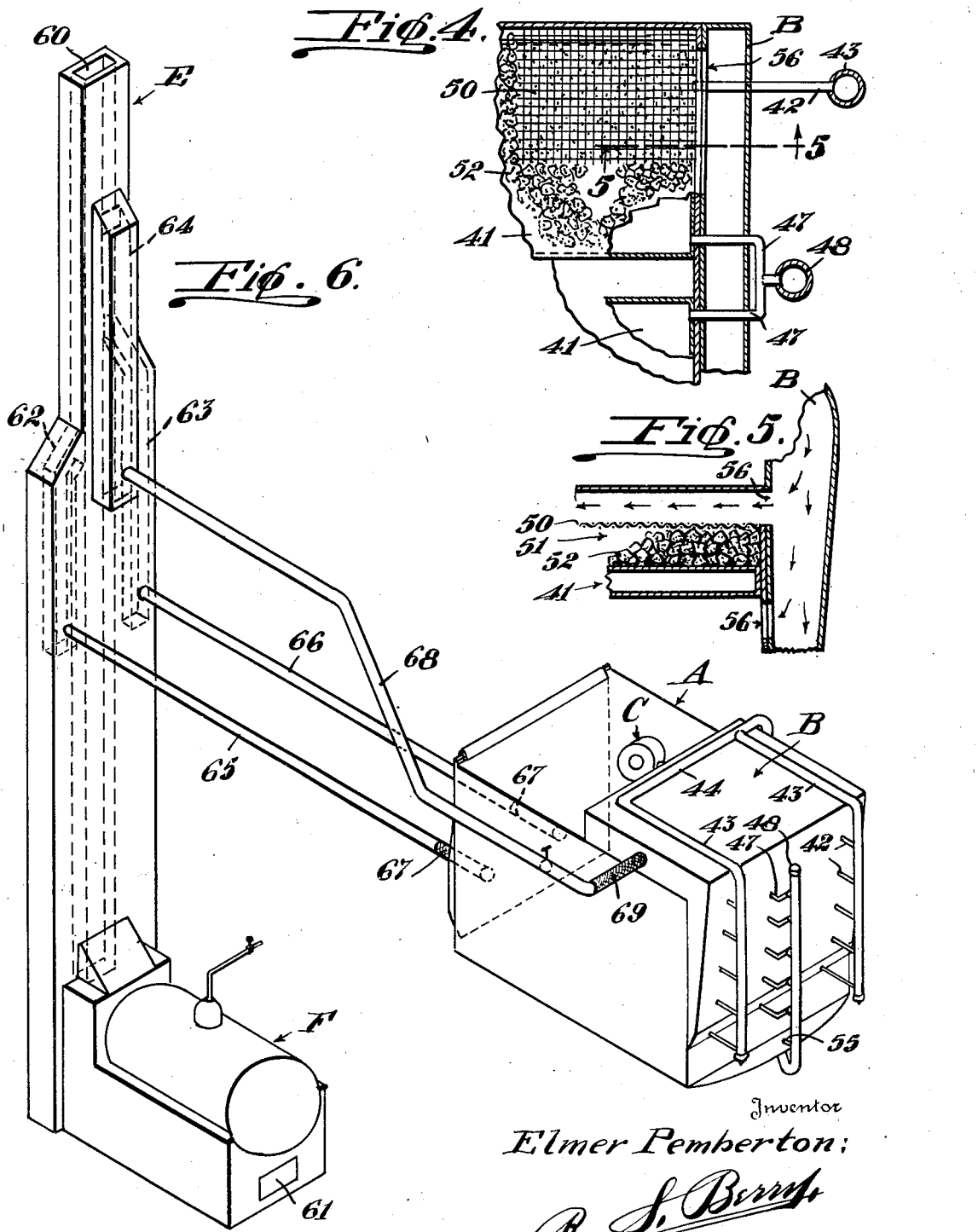

Patented Aug. 13, 1940

2,211,026

UNITED STATES PATENT OFFICE 2,211,026

APPARATUS FOR MELTING FUSIBLE MATERIALS

Elmer Pemberton, Huntington Park, Calif.

Application September 23, 1936, Serial No. 102,251

5 Claims. (Cl. 23—280)

This invention relates to an apparatus for effecting the extraction of fusible substances from solids containing same, and more particularly pertains to an apparatus which is especially applicable for use in the treatment of sulphur bearing solids in the production of crude sulphur.

An object of the invention is to provide an apparatus for subjecting solids to the action of heat in which the solids may be arranged in a receptacle in superimposed layers with each layer supported on a heating element and in which a flow of relatively cool air may be maintained across the upper surface of each layer in a fashion to effect a chilling action on vapors tending to rise from the mass such as to minimize or preclude the formation of the vapors and to effect condensation of at least a portion of such vapors as may be formed.

With the foregoing object in view together with such other objects and advantages as may subsequently appear, the invention is carried into effect as illustrated by way of example in the accompanying drawings, in which:

Fig. 1 is a view of the retort portion of the apparatus as seen in side elevation, with portions broken away and showing the rear end portion of the retort in vertical section;

Fig. 2 is a view in cross section and elevation taken on the line 2—2 of Fig. 1;

Fig. 3 is a diagram of the retort as seen in side elevation depicting the manner of tilting the retort in effecting filling and emptying thereof;

Fig. 4 is a detail in horizontal section taken on the line 4—4 of Fig. 1 with portions broken away;

Fig. 5 is a detail in vertical section taken on the line 5—5 of Fig. 4;

Fig. 6 is a diagram in perspective illustrating the manner of effecting the flow of air currents through the retort.

Referring to the drawings more specifically, A indicates generally a retort which is box-like in form and embodies top and bottom walls 7 and 8, side walls 9 and 10, and a rear end wall 11, and also includes a cover 12 for closing the open forward end of the retort body structure formed by the walls 7, 8, 9, 10, and 11. The retort A is mounted to be turnable vertically and for which purpose is fitted with trunnions 14 and 15 projecting in axial alignment from the central portions of the side walls 9 and 10 and which trunnions are pivotally supported in bearings 16 and 17 carried on frame members 18 and 19.

The retort while in operation is designed to be disposed in the horizontal position shown in Fig. 1 but is tiltable to dispose the open end thereof to extend upwardly or downwardly, as indicated in Fig. 3, in effecting loading and unloading thereof. For the purpose of facilitating tilting of the retort the shaft 15 is here shown as equipped with a toothed wheel 20 engaged by a pinion 21 on a shaft 22 which may be rotated from any suitable source of power through a gear 23 on the shaft 22 meshing with a pinion 24 on a shaft 25 connected to any suitable driving means. The shafts 22 and 25 are here shown as carried in bearings 26 and 27, respectively, supported on a bracket 28 carried by the frame 19.

The cover 12 is designed to be shifted horizontally toward and away from the open end of the retort body when the latter is in its horizontal position, and for which purpose the cover is affixed to hangers 28 depending from a carriage 29 fitted with rollers 30 supported on a vertically tiltable overhead rail 31, which rail extends longitudinally in the direction of the length of the retort A and pivoted at its outer end on a pivotal support 32 carried on an upright frame member 33.

Means are provided for tilting the rail 31 to cause the rollers 30 to travel lengthwise thereof, which means is here shown as embodying a cable 34 affixed to the free end portion of the rail 31 and passing over direction rollers 35 and leading to a windlass 36 carried on the frame 33.

The cover 12 is formed with a flange 37 on its lower end adapted to seat in a channel 38 provided on the open end portion of the retort, and the upper end of the cover is fitted with a downturned lip 39 engageable with an upstanding flange 40 on the open end of the retort, for effecting a detachable interconnection between the cover and the retort body when the cover is in its closed position.

In carrying out the invention the retort is fitted on its interior with a plurality of spaced hollow steam receiving shelves 41 which extend longitudinally of the retort from its end wall 11 to adjacent the open forward end of the retort body. The shelves are preferably arranged in a pair of spaced stacks located on opposite sides of the longitudinal center of the retort with the shelves in each stack inclining downwardly from adjacent the side walls 9 and 10 to their inner ends as particularly shown in Fig. 2 to facilitate drainage of molten fusibles therefrom.

As a means for establishing a flow of steam through the hollow shelves 41 intake pipes 42 lead into the rear ends of the shelves adjacent the outer corners thereof and connect with manifolds 43 leading to a distributor pipe 44 connecting with a housing 45 on the side walls 9 of the retort body to which steam may be delivered through the trunnion 14 which is tubular and connects through a coupling 46' with a conduit 46 leading from a source of steam supply.

Steam discharge pipes 47 lead from the lower rear end portions of the shelves 41 and connect with an exhaust manifold 48 leading downwardly at the rear end of the retort and connecting with a conduit 49 leading to a vacuum pump or other suitable means of discharge, not necessary to be here shown.

Spaced above each of the shelves 41 and extending parallel therewith is a screen 50 between which and shelves 41 is formed a space 51 for the reception of a body or layer of fusible bearing ore or similar solids 52, as indicated in Fig. 5, and which screen serves to form a layer of material of pre-determined thickness above each shelf with each layer of material of uniform thickness throughout; the screens also serving to form air spaces above the layers of materials for the flowing of air thereover as will later be described.

The lower portion of the retort body is provided with a steam jacket 53 opening to the housing 45, from the rear end of which jacket leads a discharge pipe 55 connecting with the discharge manifold 48.

An important feature of the invention resides in the provision of a means for effecting a flow of air longitudinally of the retort during operation thereof over the screen 50 in sufficient volume to effect cooling action on vapors tending to arise from the material being subjected to heat in the spaces 52 containing same. This means is here shown as including an air intake manifold B which extends across the major portion of the end wall 11 of the retort, which latter is formed with a series of elongated slots 56 affording a communication between the manifold B and the spaces above the screens 50. The air manifold B is fitted with an air intake 57 connecting with the discharge end of a blower C here shown in Fig. 1 as equipped with a steam turbine D for effecting operation of the blower and the delivery of a requisite volume of air through the retort.

Means are provided for preventing the development of an excessive pressure within the retort and also for maintaining an equalization of pressures therein which, as shown in Fig. 6, embodies a chimney E, the flue 60 of which connects with the fire-box 61 of a steam generating boiler F.

Formed on the chimney E and communicating with the flue 60 thereof is a series of flues 62, 63, and 64, the upper ends of which open to the flue 60 in spaced relation to each other. Leading from the flues 62 and 63 are air conduits 65 and 66 connecting with the cover 12 of the retort through flexible end sections 67 and opening to the interior of the forward end of the retort through the cover 12, and leading from the flue 64 is a conduit 68 connecting with the air manifold B through a flexible end connection 69 which is detachably engageable with the air manifold in any suitable fashion.

The retort is fitted with a discharge pipe 70 leading downwardly from the lower rear end portion thereof as shown in Fig. 1, which is fitted at its lower end with a closure 71, by means of which fused matter may be delivered from the retort as occasion requires.

In the operation of the invention, to fill the retort the cover 12 is retracted as shown in Fig. 3 by elevating the free end of the rail 31 so as to cause the wheeled carriage 29 to travel rearwardly on the rail; initial upward movement of the free end of the rail effecting disengagement of the cover from the retort body.

The retort is then tilted to an upstanding position as shown in full lines in Fig. 3, that is, with its open end extended uppermost, whereupon the materials to be treated in broken or granular form are delivered to the retort to fill the spaces 51 between the shelves 41 and screens 50 to a depth such that on restoring the retort to its horizontal position no appreciable amount of ore will be discharged from the front end thereof. The cover 12 is then disposed in its closed position whereupon steam is admitted to the interiors of the shelves so as to heat the latter and thereby subject the ore imposed thereon to a heating action such as to effect melting of fusibles contained therein; the molten fusibles flowing down the incline of the shelves and passing to the lower portion of the retort to discharge through the pipe 70 into a suitable settling tank arranged therebeneath.

During this melting operation the blower C is operated to deliver a flow of air at atmospheric temperature through the manifold B and into the retort through the slots 56.

In the meantime, a draught having been created in the flue 60 of the chimney E by the burning of fuel in the fire-box 61 in effecting generation of steam in the boiler F for supplying steam to the retort, the ascending of gases in the flue 60 will act through the flues 62 and 63 to induct air from the forward end of the retort through conduits 65 and 66 thus cooperating with the blower C in effecting a flow of air across the screens 50. At the same time the draught in the flue 60 will act through the flue 64 and conduit 68 to effect induction of a portion of air delivered to the manifold B so as to prevent the formation of back pressure in the latter and thus serve in equalizing pressures in the retort.

By thus passing a current of fresh air over the body of the materials confined beneath the screen 50 a chilling effect will be had on such vapors as may tend to rise from the layers of ore such as to minimize the formation of vapors and to effect condensation of a portion of such vapors as may be formed and thus obviate the driving off of volatiles and causing a consequent enrichment of the molten product.

By provision of the screens 50 which are spaced equi-distant from the several shelves the pre-determined uniform thickness of the layers of materials being treated is effected throughout the retort on filling the latter so as to equalize action of the heat and air on the several layers of the material in the retort.

After having thus treated a charge in the retort and the molten products removed therefrom the operation of the blower is discontinued, and the cover 12 is withdrawn from the retort body into its retracted position, whereupon the retort body is tilted to the downwardly inclined position indicated in broken lines in Fig. 3 so as to effect discharge of the refuse content of the retort, which refuse may be delivered to suitable conveyors for delivery to a dump. During the emptying of the retort of refuse and refilling thereof, the steam supply to the hollow shelves is cut off, and if need be the coupling 46' may be detached to permit swinging of the retort to its up-ended dumping and refilling position.

While I have shown and described a specific embodiment of the invention, I do not limit myself to the exact details of the construction and arrangement shown, but may employ such changes and modifications as occasion may require coming within the meaning and scope of the appended claims.

I claim:

1. In an apparatus for melting fusibles, a retort, material supporting hollow shelves in said retort, screens spaced above said shelves cooperating with the latter to form a layer of material interposed therebetween of pre-determined thickness with air spaces thereabove in parallel relation thereto, means for directing steam through said shelves, and means for directing streams of air across said screens.

2. In an apparatus for melting fusibles, a retort, a series of spaced hollow shelves extending longitudinally of the interior of said retort, means for directing steam to and from the interiors of said shelves, screens extending parallel with said shelves in spaced relation thereto forming uniform spaces between the shelves and screens for the reception of granular materials, in layers of uniform thickness with air spaces above said screens, means for delivering air into one end of the retort above each of said screens, and means for removing air from the opposite end of the retort.

3. In an apparatus for melting fusibles, a retort, a series of spaced hollow shelves extending longitudinally of the interior of said retort, means for directing steam to and from the interiors of said shelves, screens extending parallel with said shelves in spaced relation thereto forming uniform spaces between the shelves and screens for the reception of granular materials in layers of uniform thickness with air spaces above said screens, the rear end of said retort being formed with slots arranged to admit air above said screens, an air manifold extending over said slots, a blower for directing air into said manifold, and means for removing air from said retort at the forward end thereof cooperating with said blower to effect a flow of air across said screens.

4. In an apparatus for melting fusibles, a retort, a series of spaced hollow shelves extending longitudinally of the interior of said retort, means for directing steam to and from the interiors of said shelves, screens extending parallel with said shelves in spaced relation thereto forming uniform spaces between the shelves and screens for the reception of granular materials in layers of uniform thickness with air spaces above said screens, the rear ends of said retort being formed with slots arranged to admit air above said screens, an air manifold extending over said slots, a blower for directing air into said manifold, means for removing air from said retort at the forward end thereof cooperating with said blower to effect a flow of air across said screens.

5. In an apparatus for melting fusibles, a retort having an open end and an apertured opposed end, and a closure for said open end; a pivotal mounting for said retort on which it is movable to a vertical position with its open end uppermost; a series of spaced shelves extending longitudinally of the interior of said retort with the spaces therebetween presented toward the ends of the retort, and screens extending parallel with said shelves arranged to form spaces therebetween constituting a solid material receiving space and an air space arranged to be positioned in super-posed relation on turning the retort to its horizontal position with the air spaces uppermost, and means for flowing air into the air spaces through the apertured end of said retort.

ELMER PEMBERTON.